(12) United States Patent
Dash et al.

(10) Patent No.: US 6,501,485 B1
(45) Date of Patent: Dec. 31, 2002

(54) MESSAGE MANAGEMENT SYSTEM FOR A USER INTERFACE OF A MULTIFUNCTIONAL PRINTING SYSTEM

(75) Inventors: Robert J. Dash, Victor, NY (US); Donald Irwin, Rochester, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/182,304

(22) Filed: Oct. 29, 1998

Related U.S. Application Data

(60) Provisional application No. 60/076,486, filed on Mar. 2, 1998, and provisional application No. 60/076,433, filed on Mar. 2, 1998.

(51) Int. Cl.[7] .......................... G09G 5/00; G03G 15/00
(52) U.S. Cl. ..................... 345/700; 345/965; 399/81
(58) Field of Search .................. 345/326, 965, 345/968, 700, 736, 735, 744, 747, 762; 358/1.15; 399/81

(56) References Cited

U.S. PATENT DOCUMENTS

| | | | |
|---|---|---|---|
| 5,061,958 A | 10/1991 | Bunker et al. | 399/81 |
| 5,079,723 A | 1/1992 | Herceg et al. | 345/352 |
| 5,226,112 A | 7/1993 | Mensing et al. | 358/1.15 |
| 5,436,730 A | 7/1995 | Hube | 358/401 |
| 5,450,571 A | 9/1995 | Rosekrans et al. | 703/24 |
| 5,467,434 A | 11/1995 | Hower, Jr. et al. | 358/1.15 |
| 5,493,634 A | 2/1996 | Bonk et al. | 358/1.1 |
| 5,579,447 A | 11/1996 | Salgado | 358/1.9 |
| 5,604,860 A | 2/1997 | McLaughlin et al. | 345/326 |
| 5,614,993 A * | 3/1997 | Smith et al. | |
| 5,717,439 A * | 2/1998 | Levine et al. | |
| 5,877,746 A * | 3/1999 | Parks et al. | |
| 5,978,559 A * | 11/1999 | Quinion | |

OTHER PUBLICATIONS

Microsoft Outlook 97 (Screen dumps, pp. 1–5, 1997).*

* cited by examiner

*Primary Examiner*—Sy D. Luu
(74) *Attorney, Agent, or Firm*—Gary B. Cohen; Richard F. Spooner

(57) ABSTRACT

A programmable message storage system for a multifunctional printing system is provided. The programmable message storage system includes a configurable database for listing a plurality of message identifiers, the plurality of message identifiers corresponding respectively with the plurality of messages. The plurality of code sets corresponds respectively with the plurality of message identifiers, and each code set controls a manner in which a corresponding message is displayed on the display screen. In practice, at least one of the plurality of code sets is user programmable so that, in response to user input, the at least one of the plurality of code sets is reconfigured in the database for changing the manner in which the message corresponding with the at least one of the plurality of codes sets is displayed as a function of said reconfiguring.

9 Claims, 14 Drawing Sheets

Ready,
Network/Print Controller booting up...10% complete.
Replace Copy/Print Cartridge soon.

304

Print Queue

[Promote] [Release] [Delete] [Details] [Other Queues]
[◁] [|] [▷]

| Job # | Name | Type | Owner | Status | Priority |
|---|---|---|---|---|---|
| 1 | Progress Report | Print | Dewey Cheathem II | Printing | 3 |
| 2 | Fax 0123 | Fax | | Pending | 3 |
| 3 | Monthly Sales | Print | Mark E. Teeman | Pending | 3 |
| 4 | My Job | Print | Ima B. Wigg | Held | 3 |
| 5 | Your Job | Print | Ono U. Dawnt | Pending | 3 |

MESSAGE MANAGEMENT SYSTEM FOR A USER INTERFACE OF A MULTIFUNCTIONAL PRINTING SYSTEM

Priority is claimed from a U.S. provisional application Nos. 60/076,486 and 60/076,433, both filed Mar. 2, 1998, by the same inventors and assignee.

Cross reference is made to U.S. Pat. application Ser. No. 09/182,086 and U.S. Pat. application Ser. No. 09/182,091, both of which were filed on the same day as the present application by the same inventors and assignee.

BACKGROUND

This invention relates generally to a user interface ("UI") for a multifunctional printing system and more particularly to a management scheme for the UI which controls a manner in which precoded informational messages are delivered to the UI for displaying selected messages thereon.

Quoting from U.S. Pat. No. 5,079,723 to Herceg et al. (Issued: Jan. 7, 1992);

As reproduction machines such as copiers and printers become more complex and versatile in the jobs they do, the user interface between the machine and the operator or user, which in essence permits the dialogue (i.e., the ability to talk) between operator and machine, must necessarily be expanded if full and efficient utilization of the machine is to be realized. A suitable interface must not only provide the controls, displays, and messages necessary to activate, program, monitor, and maintain the machine, but must do so in an efficient, relatively simple, and straightforward way. For if the user interface fails in this respect, the abilities that were designed and built into the machine and which the machine owner pays for, may never be realized.

As disclosed by the '723 Patent as well as U.S. Pat. No. 5,061,958 to Bunker et al (Issued: Oct. 29, 1991) and U.S. Pat. No. 5,604,860 to McLaughlin et al. (Issued: Feb. 18, 1997) a user interface ("UI") can contain a wide range of information impacting the functionality of a corresponding printing system. Most significantly, a UI permits a user to provide the printing system with control information, such as suitable values for attributes. That is, the user typically provides control instructions for parameters associated with everything ranging from image processing to finishing characteristics. As disclosed in the above-mentioned patents, many dialogs may be required to sufficiently program the control instructions for a corresponding printing system. One exemplary way of organizing such dialogs is shown in FIG. 7 of the '860 Patent.

No matter how well organized the dialogs might be, however, relatively complex printing systems typically are associated with complex UIs. This situation is best seen in the area of network printing where information related to multiple printing machines is displayed. U.S. Pat. No. 5,450, 571 to Rosekrans et al. (Issued: Sep. 12, 1995) discloses a system in which an interclient job ticket of a network printing arrangement is filtered for the sake of displaying the selections available at a single printer, rather than a plurality of printers. In this way, a user is not burdened with the task of determining which control selections are available at all of the printers in the network printing system, but rather with simply determining what control selections are available at the printer selected by the user.

As further disclosed in U.S. Pat. No. 5,061,958 and U.S. Pat. No. 5,467,434 to Hower et al. (Issued: Nov. 14, 1995), a typical UI will include certain status information relating to selected operational information about a corresponding printing machine. For instance, the dialog in FIG. 4 of the '434 Patent conveys when the system is "Ready to Scan" and/or "Ready to Print". As further shown in the two above-mentioned patents, the status information is commonly provided in conjunction with control information, while the dialog is partitioned in such a manner that the control information is shown in one section and the status information is shown in another. Commonly, when the control and status information are shown together, the amount of space devoted to the status information is relatively small. Provided that the amount of status information is relatively minimal, then this does not pose a problem. When the amount of status information is relatively large, however, fitting a significant amount of control and status information on a single screen can be challenging.

When using a multifunctional printing machine with many services and a relatively small display screen, it may be impossible to fit all of the status information on a display screen with accompanying control information. In one example, this situation is handled by rotating status messages on a timed basis. That is, one status message is displayed during one time interval, while another status message is displayed during another time interval. This can be annoying to a user and even counterproductive if the user misses a status message because s/he is concentrating on programming control related attributes rather than observing the timed status message currently being displayed.

Moreover, multifunctional printing machines can possess a significant number of services, e.g. print, copy, fax, and filing services, and hence generate a variety of interfering status messages. For example, a group of messages associated with the print service (which is often network oriented) may have little to do with a set of messages relating to the copy service (which is often locally oriented). Accordingly, displaying messages in a non-ordered manner may be very confusing. For example, displaying a status message relating to one service while programming in another service is not optimal. It is believed that many of the challenges associated with comprehending the full significance of status messages in an easy, straightforward manner could be alleviated by providing a status messaging system in which status messages are displayed in an organized fashion where the particular messages being displayed are logically related to the control information being displayed therewith.

Finally, reconfiguring status message systems can be a very difficult task in view of the way a typical UI messaging system is developed. Commonly, code is written to provide a variety of status messages and that code is then compiled. When UI messaging systems are set up in this manner, it is necessary, for the sake of adding, deleting or changing messages, to alter existing code and then recompile the same. This not a procedure that is accessible to a typical machine owner. It would be desirable to provide a UI messaging system in which the machine owner could readily reconfigure status messages to accommodate for changes in system demand.

SUMMARY OF THE INVENTION

In accordance with the presently disclosed invention there is provided a programmable message storage system for a multifunctional printing system including a printing machine for producing prints from an electronic document stored therewith. The printing machine includes a user interface with a display screen upon which one or more of a plurality of messages can be displayed for providing a user with status information about the printing system. The programmable message storage system, in the plurality of messages are stored, comprises: a configurable database for listing a plurality of message identifiers, the plurality of message identifiers corresponding respectively with the plurality of message; a plurality of code sets corresponding respectively with the plurality of message identifiers, each code set controlling a manner in which a corresponding message is displayed on the display screen; and at least one of the plurality of code sets being user programmable so that, in response to user input, the at least one of the plurality of code sets is reconfigured in the database for changing the manner in which the message corresponding with the at least one of the plurality of codes sets is displayed as a function of said reconfiguring.

BRIEF DESCRIPTION OF THE DRAWINGS

FIG. 7 is an elevational view of a screen including a set of status information and attribute related information corresponding with a Print Queue service;

FIG. 10 is an elevational view of a screen including a set of status information and attribute related information corresponding with the Copy service;

Figure 12:
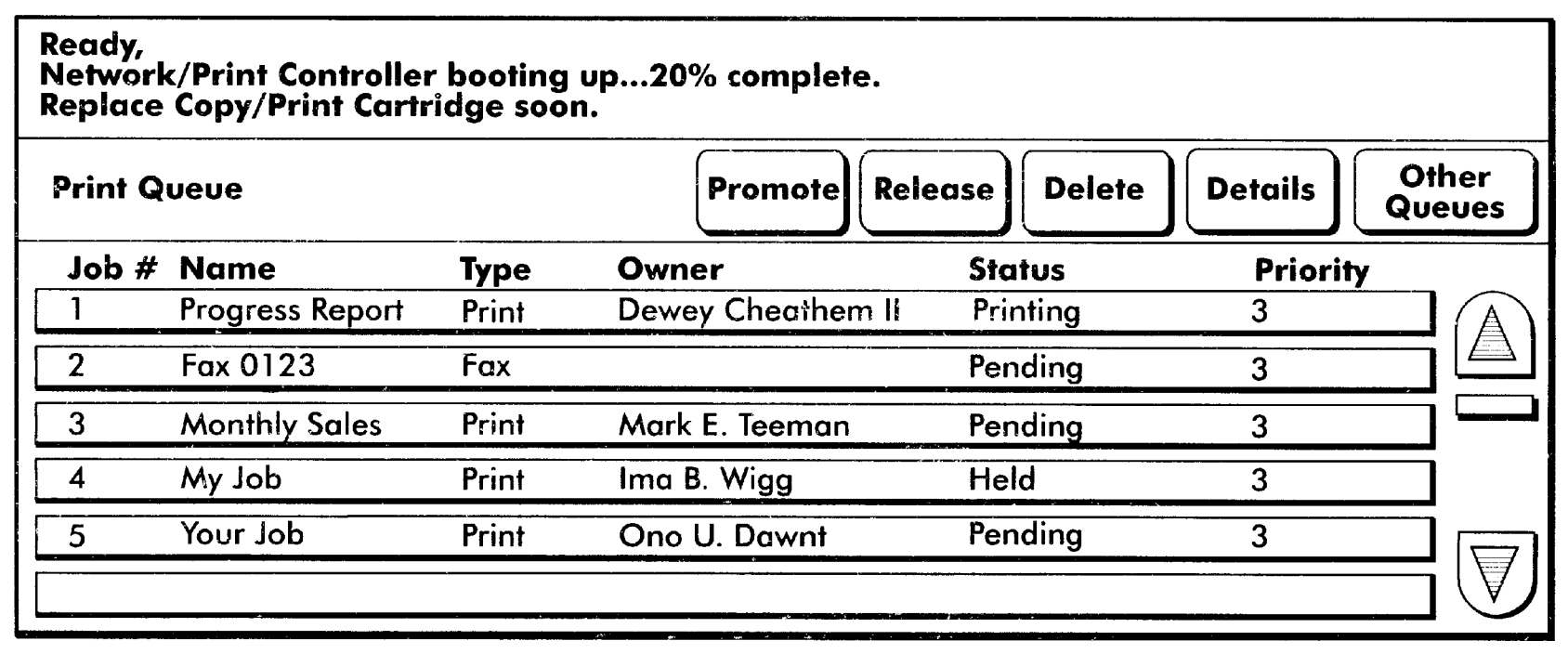

FIG. 12 is an elevational view of a screen including a set of status information and attribute related information corresponding with a Print Queue service;

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
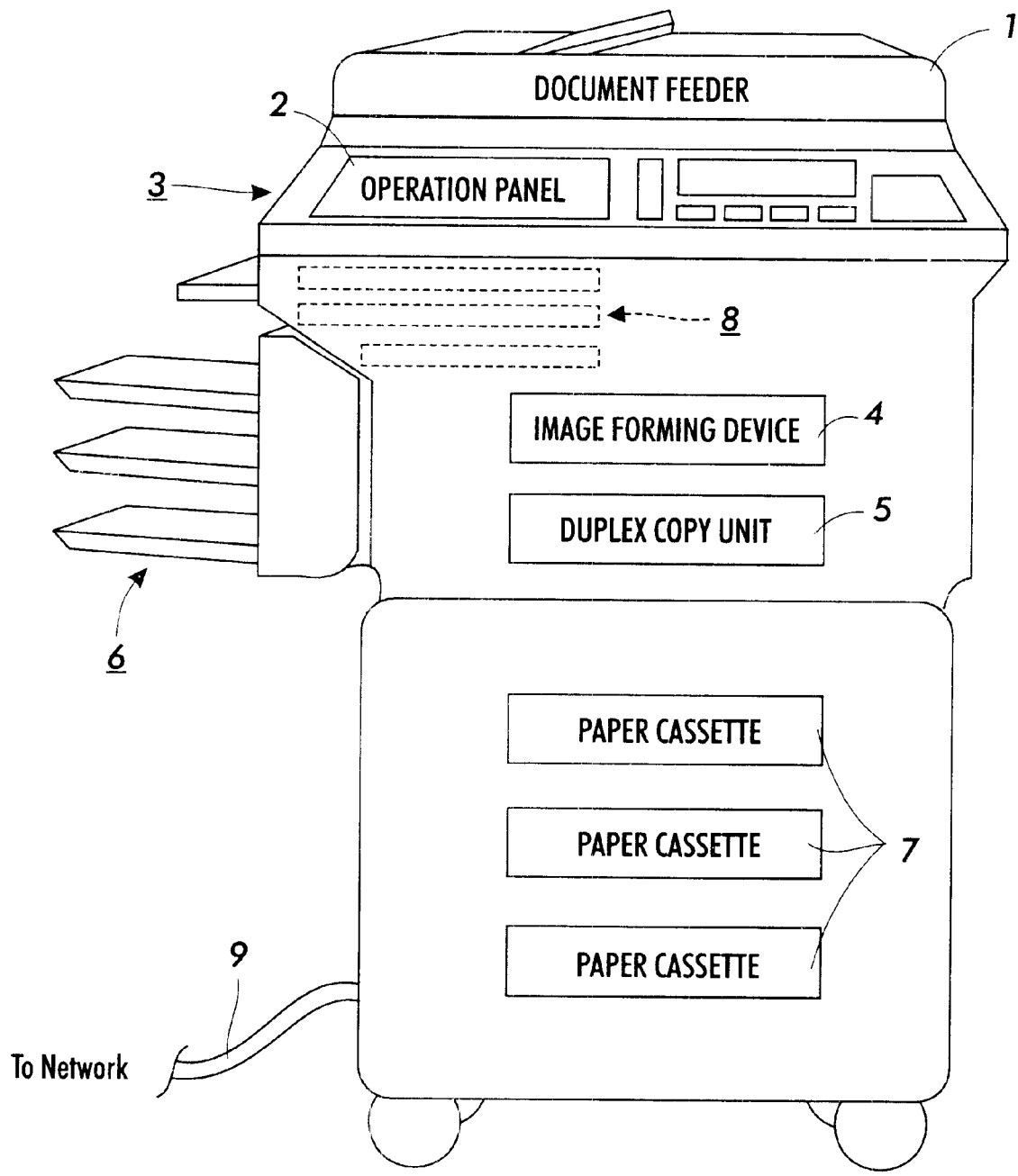
FIG. 1 a perspective view of a networked printing machine.

Referring to FIG. 1 of the drawings, a digital printing apparatus of the type suitable for use with the preferred embodiment is designated with the numeral 1. As shown, the system includes a document feeder 2 and an operation (and display) panel or user interface ("UI") 3. After desired conditions have been entered on the operation panel 3, through the aid of a suitable display, the document feeder 2 conveys a document to a predetermined reading position on an image reading device 4 and, after the document has been read, drives it away from the reading position. The image reading device 4 illuminates the document brought to the reading position thereof. The resulting reflection from the document is transformed to a corresponding electric signal, or image signal, by a solid state imaging device, e.g., a CCD (Charge Coupled Device) image sensor. An image forming device 5 forms an image represented by the image signal on a plain paper or a thermosensitive paper by an electrophotographic, thermosensitive, heat transfer, ink jet or similar conventional system.

As a paper is fed from any one of paper cassettes 8 to the image on forming device 5, the device 5 forms an image on one side of the paper. A duplex copy unit 6 is constructed to turn over the paper carrying the image on one side thereof and again feed it to the image forming device 5. As a result, an image is formed on the other side of the paper to complete a duplex copy. The duplex copy unit 6 has customarily been designed to refeed the paper immediately or to sequentially refeed a plurality of papers stacked one upon the other, from the bottom paper to the top paper. The papers, or duplex copies, driven out of the image forming device 5 are sequentially sorted by a output device 7 in order of page or page by page.

Applications, generally 9, share the document feeder 1, operation panel 2, image reading device 3, image forming device 5, duplex unit 6, output device 7, and paper cassettes 8 which are the resources built in the copier system. As will appear, the applications include a copier application, a printer (IOT) application, a facsimile (FAX) application and other applications. Additionally, the digital copier system is coupled with a network by way of a conventional network connection 9.

Figure 2:
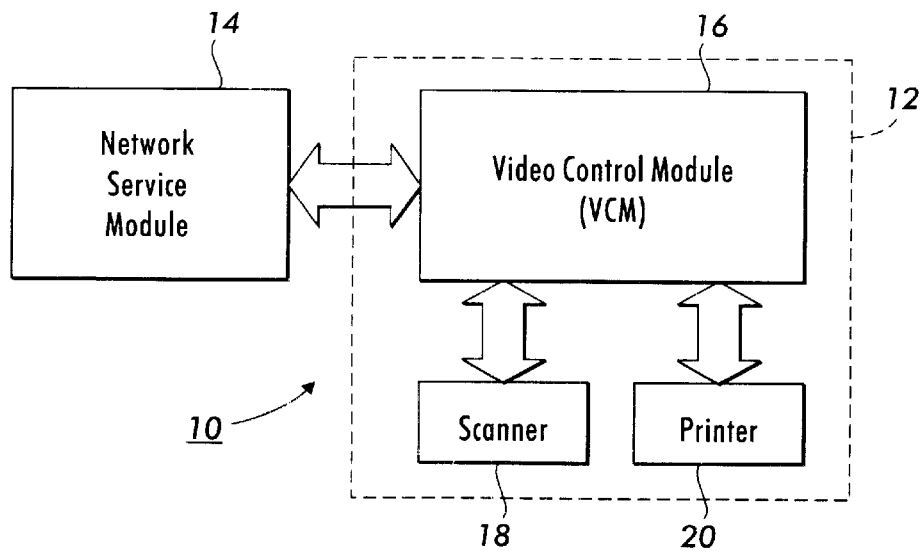
FIG. 2 is a block diagram depicting a multifunctional, network adaptive printing machine.

Referring to FIG. 2, a multifunctional, network adaptive printing system is designated by the numeral 10. The printing system 10 includes a printing machine 1 operatively coupled with a network service module 14. The printing machine 1 includes an electronic subsystem 16, referred to as a video control module (VCM), communicating with a scanner 18 and a printer 20. In one example, the VCM 16, which is described in detail in U.S. Pat. No. 5,579,447 to Salgado, the disclosure of which is incorporated herein by reference, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (not shown).

Referring still to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory, while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
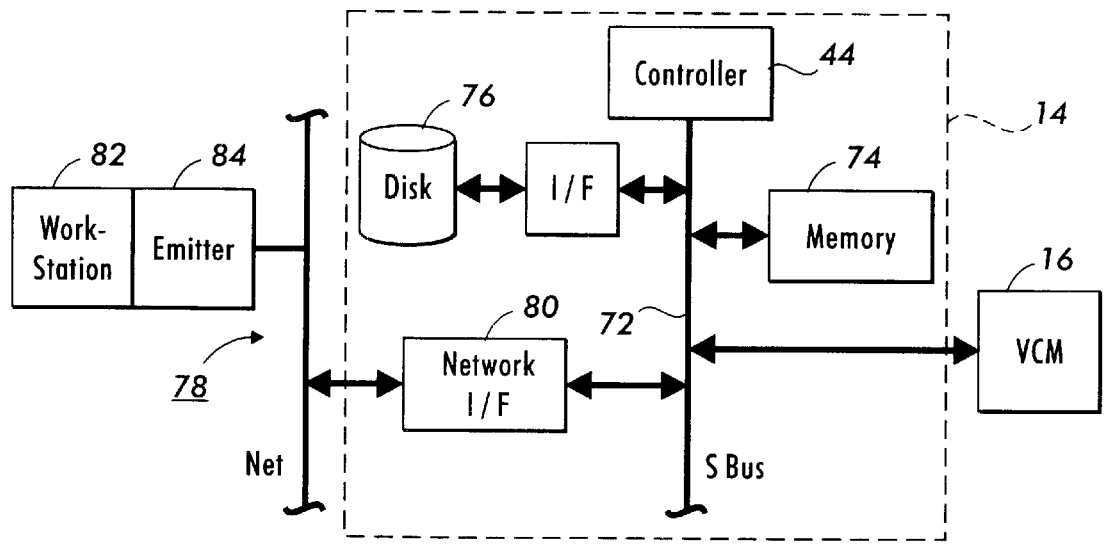
FIG. 3 is a block diagram of a network controller for the printing machine of FIG. 3.

Referring to FIG. 3, the network service module 14 is discussed in further detail. As will be recognized by those skilled in the art, the architecture of the network service module is similar to that of a known "PC clone". More particularly, in one example, a controller 44 assumes the form of a SPARC processor, manufactured by Sun Microsystem, Inc., is coupled with a standard SBus 72. In the illustrated embodiment of FIG. 3, a host memory 74, which preferably assumes the form of DRAM, and a SCSI disk drive device 76 are coupled operatively to the SBus with a suitable Interface chip. As further shown in FIG. 3, the SBus is coupled with a network 78 by way of an appropriate network interface 80. In one example, the network interface includes all of the hardware and software necessary to relate the hardware/software components of the controller 24 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underfying the concept of interpreting a PDL job are provided in U.S. Pat. No. 5,493,634 to Bonk et al. and U.S. Pat. No. 5,226,112 to Mensing et al., the discloser of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Further details regarding the implementation of a network capable printing system may be obtained by reference to U.S. Pat. No. 5,436,730 to Hube (Issued: Jul. 25, 1995), the disclosure of which is incorporated herein by reference.

Referring to FIG. 7, a system for managing a manner in which informational or status messages are displayed on the UI 3 (FIG. 1) is described. As shown in FIG. 7, the UI includes a display screen 300 which includes display portions 302 and 304. It should be recognized that control data, i.e. information relating to a manner in which a job is to be processed with a particular document processing service (e.g. Fax Service), is displayed in portion 302 and information relating to system status is displayed in portion 304.

Referring specifically to portion 304, status information is preferably displayed on multiple lines, hence this information, which comprises messages to the user, is referred to hereinafter as "line messages". It will be appreciated by those skilled in the art that a "user" can include a broad range of persons accessing the printing system 10 at its customer use site. These persons may include higher level users, at the customer use site such as code developers or system administrators, or ordinary users, such as walk-up users with copy jobs. Moreover the disclosed informational management system is interchangeably referred to hereinafter as a "line message manager". It will be appreciated that while the portion 304 is shown as including three lines, more or less lines could be displayed in portion 304 without affecting the principles upon which the preferred embodiment is based.

In brief, the message management system of the preferred embodiment can be summarized as follows:

Overview

Line messages are intended to convey information regarding status of each service, job status for active jobs and general machine status. Line messages are those messages displayed preferably in the portion 304 of the User Interface screen 3 (FIGS. 1 and 7).

Line message management is required to control potential conflicts when the system is trying to display two or more messages to the same line at the same time.

Line message behavior is controlled by assigning a message ID to each message. The message ID contains a set of embedded codes [or indicators] which identify the pathway, line, priority and length of time the message is to be displayed.

By way of supplementing this overview, reference is made to the following exemplary description regarding the concept underlying message configuration:

Each message is given a unique set of codes or indicators which serve to define the desired Service Type, Message Types, Message Priority, and Category. A Message Algorithm (which is described in further detail below) decodes and displays the message at an appropriate time, on an appropriate line (of portion 304) and with an appropriate screen. For example, the message "Network/Print Controller booting up" (FIG. 7) may be assigned the codes "ESS, 2, 30, N, 1" designating where and when the corresponding message is to be displayed.

These codes or indicators are defined as follows:

ESS ("Electronic Subsystem")—This is a combination Service Type code. This means that the message will be displayed for services that require the ESS, i.e. the network service module 14 (FIG. 3). Therefore the message is displayed when viewing Print Queue, Scan-to-Network and Media Print screens, but not when displaying Copy or Fax screens.

2—The message is grouped with similar Message Types that are always displayed on line 2.

30—The message has a priority of 30. If two Message Types are sent to the User Interface at the same time, the one with the lower number will be displayed and any messages with higher numbers will be stored. When the lower number message is removed, the higher number message will automatically be displayed. In addition, message priorities are established in such a manner that dynamic messages (messages that are displayed during job processing) have a higher priority than static messages (machine status type message that indicate to the user if the machine is capable of processing their job, before they start the job).

N—not a timed message.

1—All messages regarding the Network/Print Controller may be grouped in Message Category so that all messages in the corresponding group can be removed from or displayed on the user interface screen with a single command.

An exemplary set of messages with their corresponding identifiers and codes are shown in the following Table 1:

Path:

This code controls the display pathway. A message can be displayed in a single path or in multiple paths. A message encoded with the Copy path would be displayed when the User Interface is displaying Copy related screens. A message encoded with the IOT path would be displayed when the User Interface is displaying Copy, Print Queue or Media Print screens.

A number of contemplated code controls are listed by way of the following Table 2:

TABLE 1

Line Message Example

| No. | Message ID | Path | Line | T | Pr | Cat | Message |
|---|---|---|---|---|---|---|---|
| 1 | MSG_ULIO_COPY_READY | CO | 1 | N | ST | 0 | Ready to copy. |
| 2 | MSG_TRAY_X_MOVE_UP | ALL | 2 | N | DT | 1 | Tray %d moving up. |
| 3 | MSG_FAX_REMOTE_NORECV | FQ | 1 | T | EM | 0 | Error detected . . . remote fax can not receive. |
| 4 | MSG_IOT_LH_INTERLOCK_OPEN | ALL | 2 | N | AF | 3 | Close Upper Left Door. |
| 5 | MSG_IOT_COND_TONER | IOT | 3 | N | TO | 0 | Copy/Print Cartridge very low . . . replace soon. |
| 6 | MSG_PRINTING_SET_X | CO | 3 | N | ST | 0 | Copying set %d. |
| . | | | | | | | |
| . | | | | | | | |
| . | | | | | | | |
| N | | | | | | | |

Preferably the Message Identifier ("ID") is used for telling the Line Message Manager (i.e. the application or program used to control the transfer of messages to and from the UI display) to display the message "Ready to copy." in the copy pathway, on line 1, as a non-timed message, with "Status" message priority and no category association.

Figure 4:
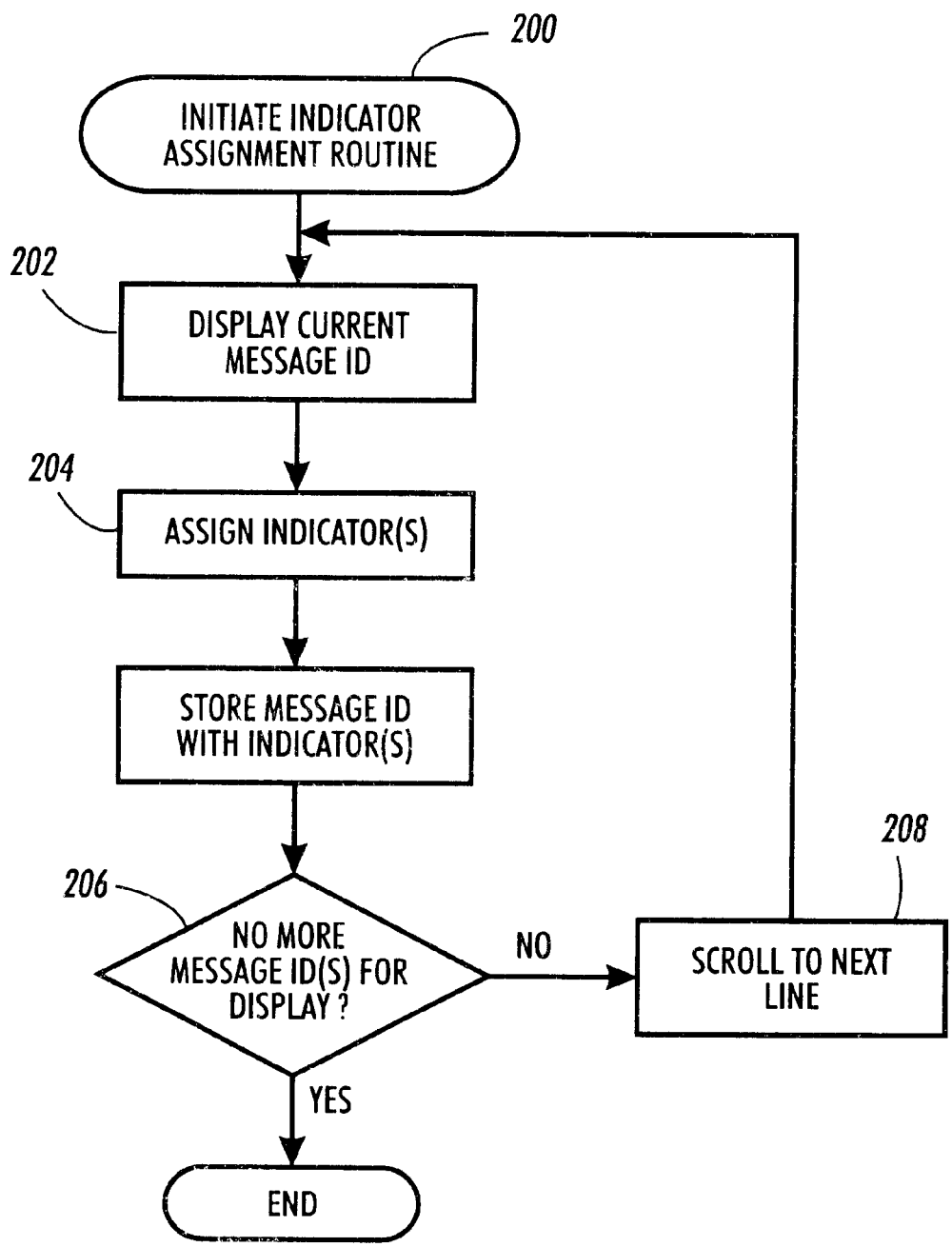
FIG. 4 is a flow diagram demonstrating an exemplary technique for developing a configurable database for use in storing messages to be displayed on the display screen of a user interface.

As will be appreciated by those skilled in the art, the information of Table 1 can be conveniently stored with a conventional database configured, for example, in memory 74 (FIG. 3). Referring to FIG. 4, an exemplary technique for developing Table 1 in the database is shown. More particularly, at step 200, a code assignment routine is initiated and, at step 202 a Current Message ID is provided. All of the indicators associated with the displayed ID, namely indicators corresponding with Path, Line, Timer ("T"), Priority ("P") and Category ("Cat") are then, by way of step 204, entered into the database. The Current Message ID, along with its corresponding indicators, are then stored for future use (step 206) and a check is performed, at step 208, to determine if further Message IDs are to be programmed. Assuming further Message IDs are to be programmed, then a programmer scrolls down a line in the database table: otherwise the routine ends.

A more comprehensive understanding of the objects defined by Table 1 can be obtained by the following description of corresponding terms:

Message ID:

The Message ID is linked with message text and to a set of embedded codes which contain information regarding the message display parameters—Path, Line, Timer, Priority and Category.

To display a message, a function which sends the Message ID to the Line Message Manager is called. The Line Message Manager then decodes the Message ID and displays the message text on the User Interface with the appropriate Path, Line, Timer, Category and Priority.

To remove a message, a function which sends the Message ID to the Line Message Manager is called. The Line Message Manager then decodes the Message ID and removes the message text from the User Interface.

TABLE 2

| Path Code | Path Name |
|---|---|
| CO | Features: Copy |
| FX | Features: Fax |
| SC | Features: Scan |
| PF | Features: Media Print (Print Floppy) |
| PQ | Job Status: Print Queue + Complete Print Queue |
| FQ | Job Status: Fax Queue + Complete Fax Queue + failed Fax Queue |
| SQ | Job Status: Scan Queue + Completed Scan Queue |
| MS | Machine Status: All |
| KO | Setups |
| ALL | All of the above |
| IOT | CO + PQ + PF |
| IIT | CO + FX + SC |
| ESS | PQ + PF + SC + SQ |
| PPM | PF + PQ |
| QS | PQ + SQ + FQ |
| JS | Job Status: Other Queues (screen that displays all Queue types) |
| DG | Diagnostics Mode |
| * | not used |
| * | not used |
| N | not used |

Line:

Examples of code listing for Line, controlling that line upon which a given message is displayed, are shown in the following Table 3:

TABLE 3

| Line Code | Line Number |
|---|---|
| 1 | Line 1 |
| 2 | Line 2 |
| 3 | Line 3 |

Timer:

This code is on (T) if the message is to be displayed for a predetermined amount of time and then automatically removed by the Line Message Manager. The timer length is programmable so that it can be adjusted, if required, for different languages.

If message removal is time driven, then software is preferably designed to remove a given message by one of the following approaches:

remove a single message (including timed messages);

remove all messages with same priority;

remove all messages with same pathway (Status (ST) messages will not be removed by this command); or remove all messages with same category.

Priority:

This code controls the priority of a message relative to other messages. One contemplated set of general rules for display are as follows:

Customer action drives an immediate message display.

When status is updated, immediately display the new status and delete the old status.

Dynamic messages temporarily overwrite static messages.

Figure 14:
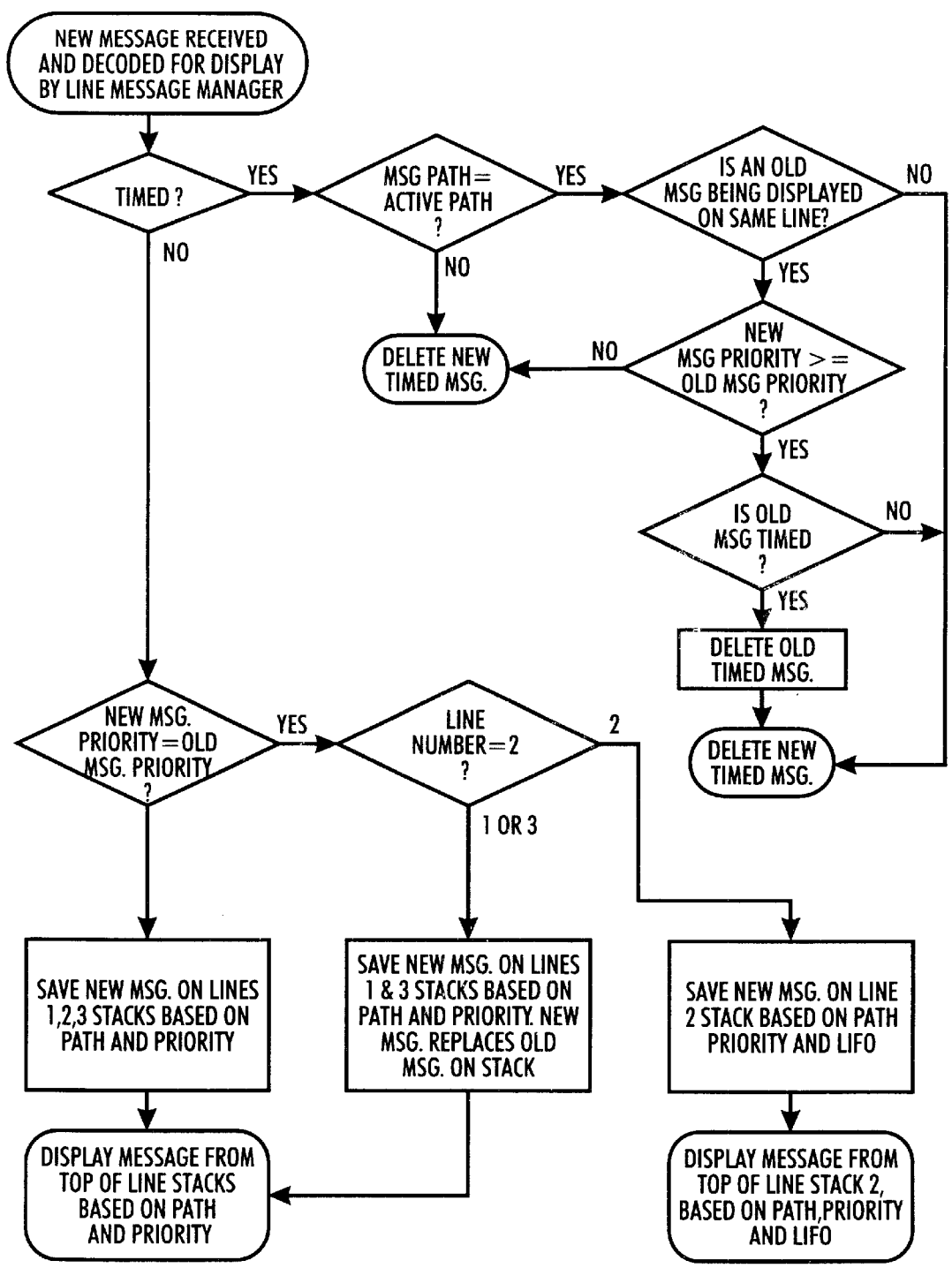
FIGS. 14 and 15 comprise a flow diagram demonstrating selected functionality of a Line Message Manager.
Figure 15:
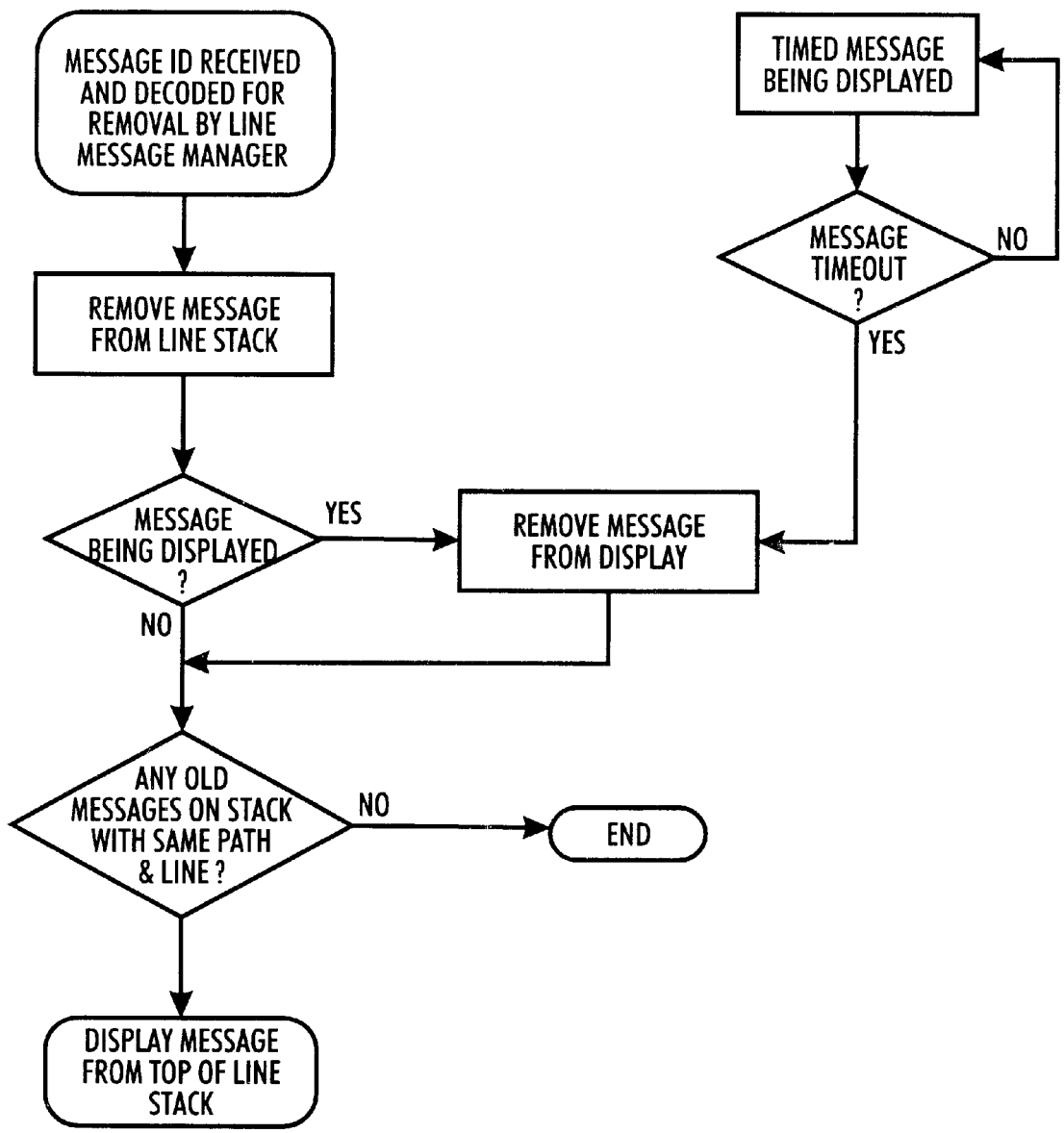

Line Message Priority can be understood by reviewing the following rules in conjunction with the flow diagrams of FIGS. 14 and 15:

Non-Timed Messages:

When a new message is sent to the Line Message Manager, decode the message ID to determine the path, line and priority and timing, save the message on a stack based on path, line and priority, if there is an existing message on the stack with the same path, line and priority, a) lines 1 or 3, replace the old message with the new message, b) line 2, save the new message on top of the old message.

Timed Messages:

When a new message is sent to the Line Message Manager, decode the message ID to determine the path, line and priority and timing, if the message path is not being displayed, delete the new timed message, if there is no message being displayed on that line, display the new timed message, if there is an existing message on the stack with the same path, line and higher priority, delete the new timed message, if there is an existing message on the stack with the same path, line and lower priority, and the old message is non-timed, display the new timed message.

Message Display:

When a higher priority message is removed;

a) lines 1 or 3, display the next message from the top of the stack based on Path and Priority, b) line 2, display the next message from the top of the stack based on Path, Priority and Last-In-First-Out (LIFO).

Fault Messages:

When a Fault occurs, the message manager should remove any messages on Lines 1 and 2, saving the non-timed messages and deleting the timed messages.

When the Fault is cleared, the message manager should re-display the saved messages on Lines 1 and 2.

Pathway Changes:

When the screen pathway is changed by the user;

delete any timed messages displayed in the old pathway, save all non-timed messages currently displayed in the old pathway, only display the message which has a valid display code for new pathway.

re-display old messages when they return to old pathway.

Clear All:

Pressed Once: Clear all messages in the displayed pathway except Status (ST) messages.

Pressed Twice: Clear all messages in all pathways except Status (ST) messages.

Auto Clear All:

Clear all messages in all pathways except Status (ST) messages.

Category:

This code groups all related message into a single category. This allows messages in that category to be removed with a single command. For example, during a fault, many line message may be displayed as part of the fault clearance procedure. If the fault is cleared, all fault category messages can be cleared with one command. An exemplary set of categories is shown in the following Table 4:

TABLE 4

| Category Code | Category Name |
| --- | --- |
| 1 | Tray status messages |
| 2 | Diagnostics status messages |
| 3 | Fault messages |
| 4 | Fax Queue error messages |
| * | not used |
| * | not used |
| N | not used |

Figure 5:
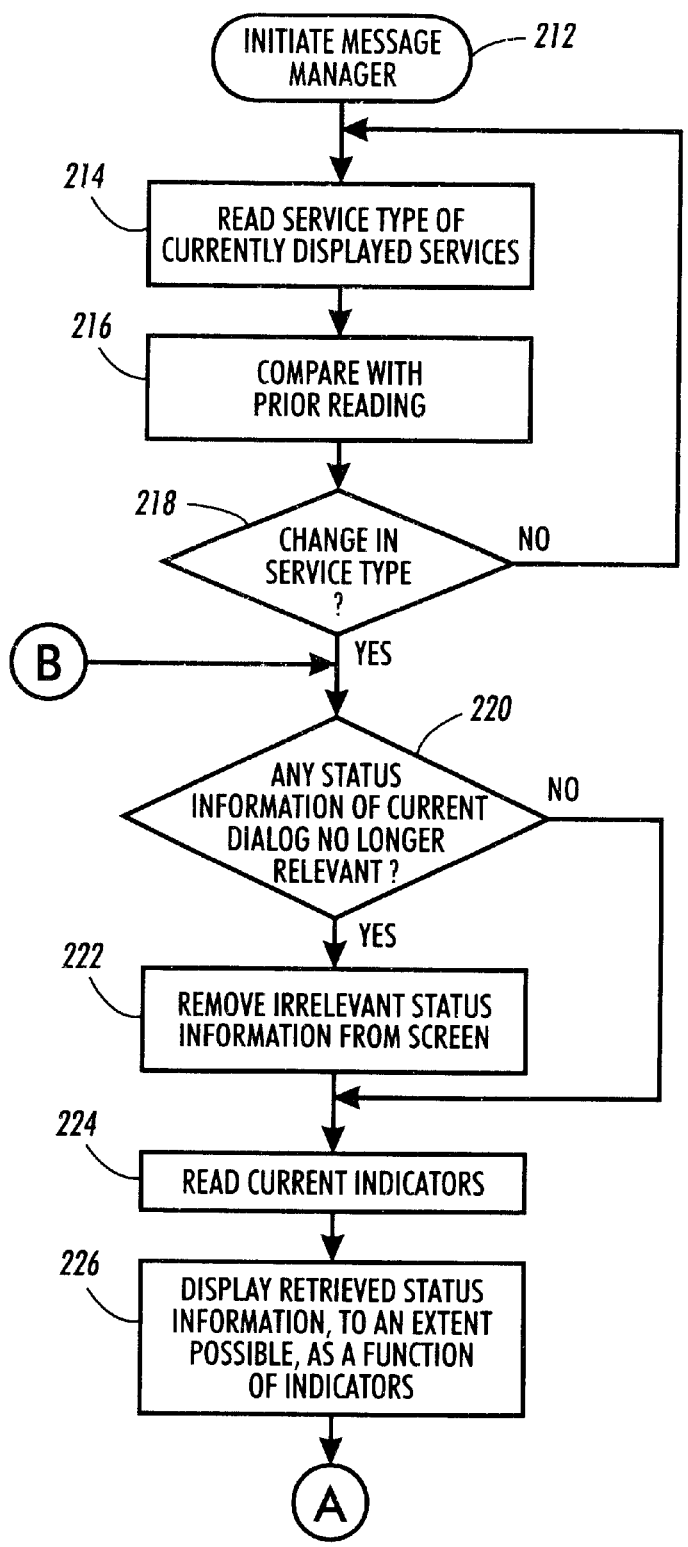
FIGS. 5 and 6 comprise a flow diagram showing a technique for displaying messages by reference to the database developed with the technique of FIG. 4.
Figure 6:
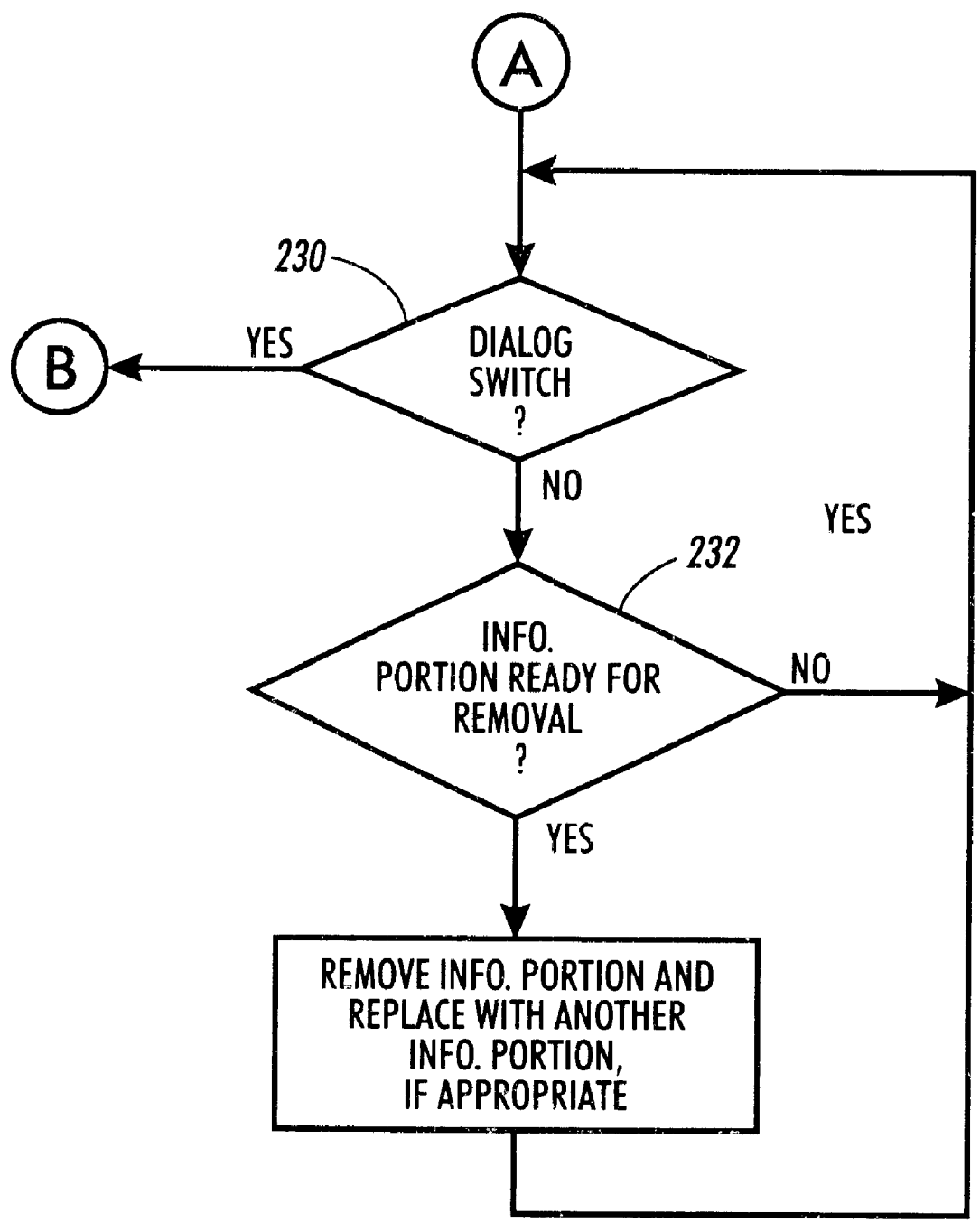
Figure 9:
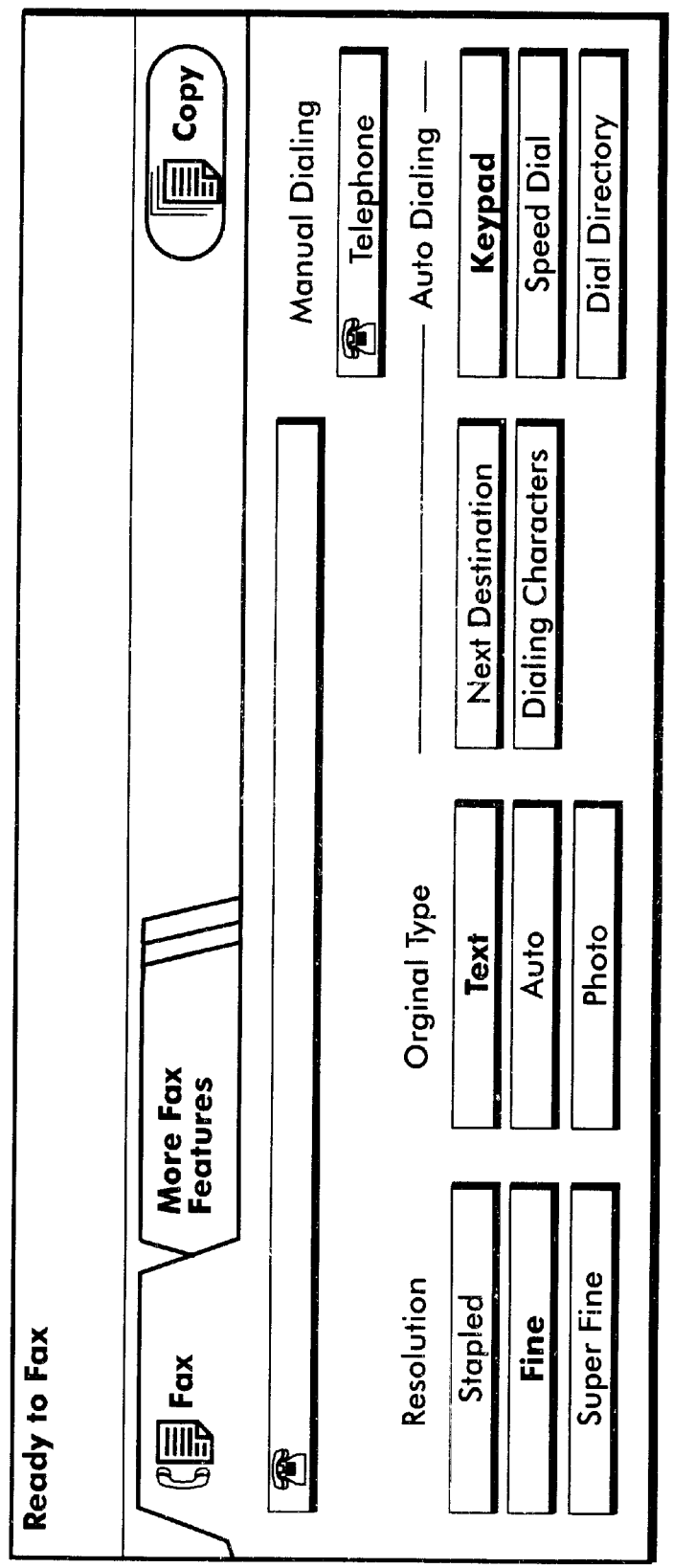
FIG. 9 is an elevational view of a screen including a set of status information and attribute related information corresponding with a Fax service.

Referring to FIG. 5, a flow diagram emphasizing some of the important principles of the preferred embodiment is provided. Referring specifically to step 212, the Message Manager Application of the preferred embodiment is enabled and the service type of the dialog currently displayed on the UI display (FIG. 9) is read at step 214. It is assumed, for ease of discussion, that the Manager has knowledge of what service type was being displayed at a selected time prior to performing the reading of step 214. In turn, the Manager uses this knowledge of prior service type to make a comparison with current service type at step 216. If the service type has not changed (see step 218), then another reading is taken (after a selected time interval) at 214.

Assuming that the service type has changed, then the Manager, by way of step 220, checks to see what information is no longer needed on the screen. In one example, certain status information associated with the Fax Service is removed when the service type changes to Copy Service. With respect to any status information which is no longer relevant, the Manager causes such irrelevant information to be removed from the display screen at step 222. As can now be appreciated, the Manager knows which status information or messages require removal by reference to the indicators of Table 1. Greater insight with respect to steps 220 and 222 can be obtained by reference to the examples provided below.

Pursuant to removing information from the screen, the Manager, scans the indicators of the database (step 224) and determines which messages are to be displayed on the display screen. Under certain circumstances the Manager will determine that not all of the messages related to the current service type can be displayed on the screen and/or that currently displayed messages (i.e. messages that were on the screen prior to performing step 214) corresponding with the current service type will, at least for the time-being, have to be removed from the screen. As follows from the discussion above, conflicts can be resolved with step 224 by reference to the various codes of the database, such as the Priority Code. It should now be recognizable, nonetheless, that conflicts in message display will not always be resolvable by reference to the Priority Code alone. For example, a first message may have a low priority relative to a second message, but, because of Line assignment (i.e. "L"), the first message may be displayable while the second message is not.

In view of step 224, the Manager, at step 226, causes as many messages as possible to be displayed on the UI screen. Subsequently, a check is performed (at step 230) to determine if a dialog change, with respect to service type, has occurred again. If a change in service type has occurred, then the process loops back to step 220 where previously described steps are performed again to change the screen, with respect to status messages, to an extent necessary.

Even if no dialog switch has occurred, however, it may be necessary to remove selected information from the screen and/or place other information on the screen (see steps 232 and 234). In one example, it may be necessary to remove a timed message because its time has expired. In another example it may be necessary to remove a message because a condition has been met (e.g. a fault has been cleared). In yet another example, it may be necessary to place a message on the screen because a new condition arises (e.g. a fault occurs or toner drops below a preselected threshold). Implementation of steps 232 and 234 is discussed in further detail above with respect to FIGS. 14 and 15.

Further understanding of the preferred embodiment can be appreciated by reference to the following examples:

EXAMPLE 1

The printing machine 10 (FIGS. 1 and 2) is powered on and the Network/Print Controller boots up.

If the customer views the Print Queue screen (FIG. 7), then information required by the customer to complete their Print Queue job is displayed.

Figure 8:
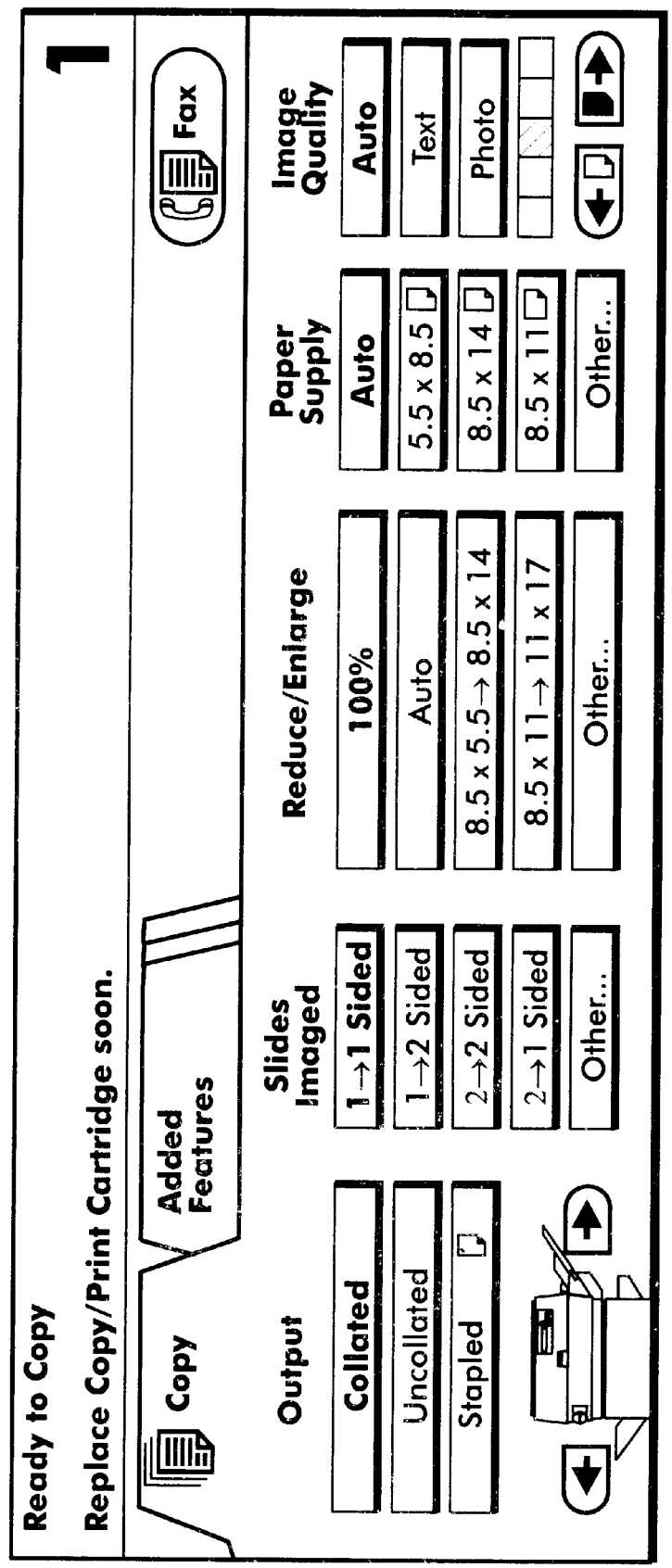
FIG. 8 is an elevational view of a screen including a set of status information and attribute related information corresponding with a Copy service.

If the customer immediately switches to view the Copy screen (FIG. 8), then information required by the customer to complete their Copy job is displayed. The Network/Print Controller is not required for Copy jobs so that information is not displayed in the Copy screen. The Copy/Print Cartridge status is required for both Print and Copy jobs so that information is displayed in both screens.

If the customer then switches to view the Fax screen (FIG. 9), then information required by the customer to complete their Fax is displayed. The Network/Print Controller is not required for Fax jobs so that information is not in the Fax screen. The Copy/Print Cartridge status is not required for Fax jobs so that information is not displayed in Fax screen.

EXAMPLE 2

The customer switches to Copy screen, loads documents and presses a Start button.

Figure 10:
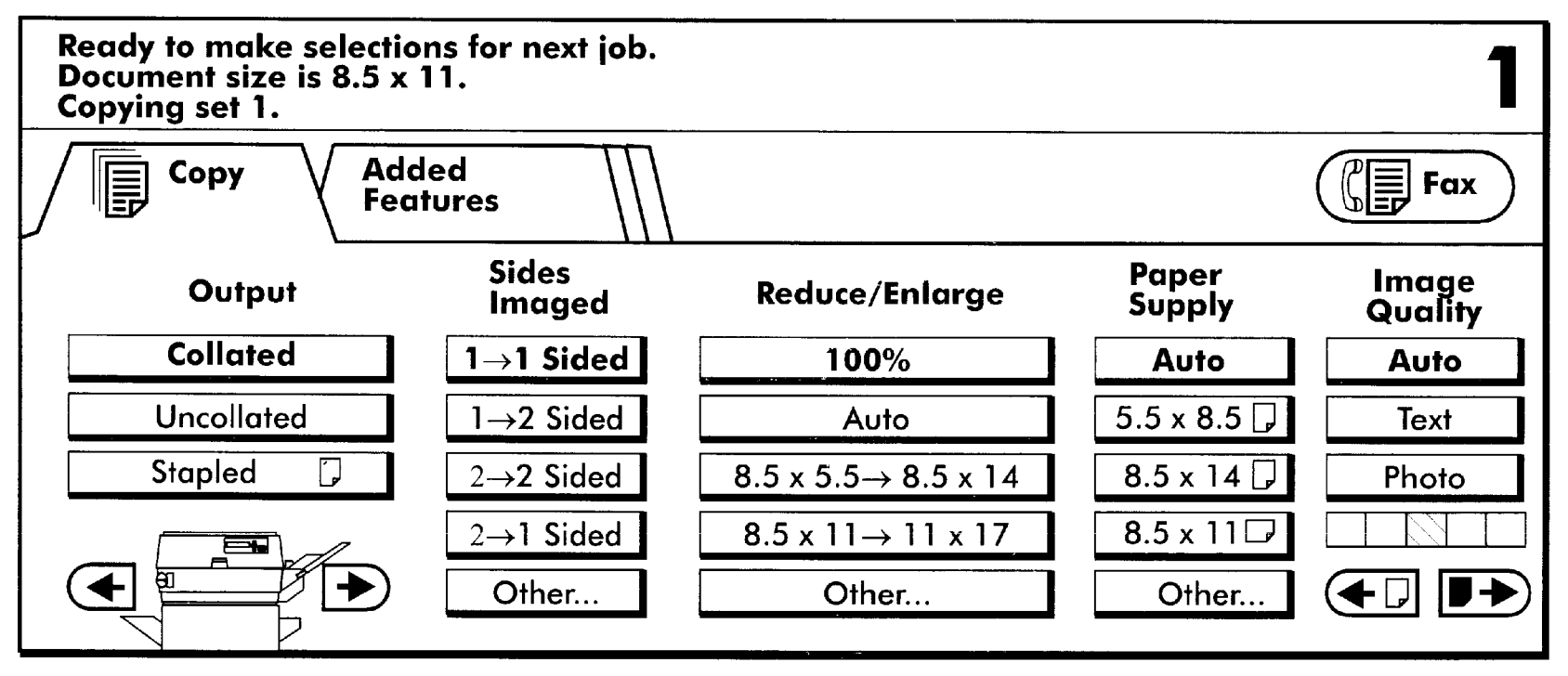

A Ready message is updated on line 1 (FIG. 10); a Document size message is displayed on line 2; and a Copying message is displayed on line 3. As contemplated in one embodiment, only information required by the customer to complete their Copy job is displayed. The Network/Print Controller is not required for Copy jobs so that information is not displayed in the Copy screen. The Copy/Print Cartridge status is required for Copy jobs but is temporarily suppressed by the higher priority job status message. After the copy job is completed, the (stored) Copy/Print Cartridge status message is automatically re-displayed.

Figure 11:
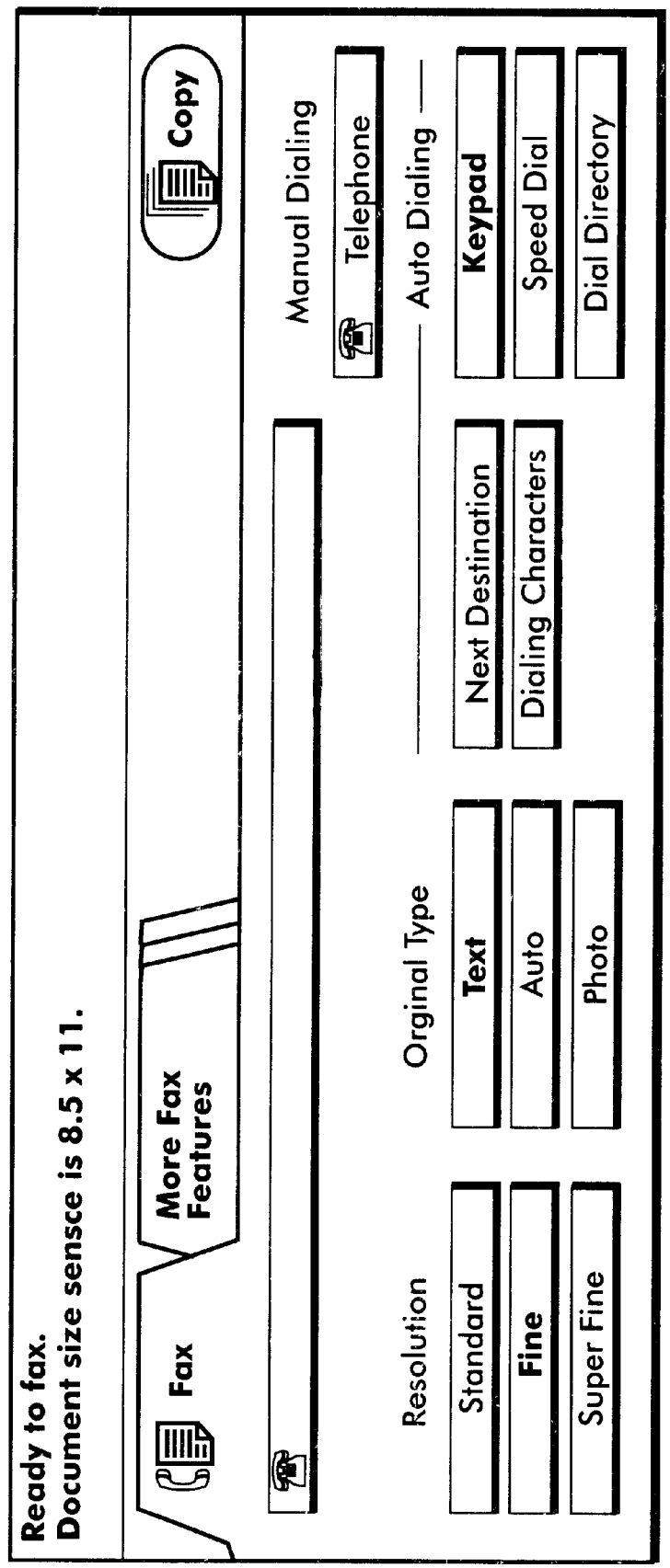
FIG. 11 is an elevational view of a screen including a set of status information and attribute related information corresponding with the Fax service.

If the customer switches to view the Fax screen (FIG. 11), information required by the customer to complete their Fax job is displayed. Document size message is displayed on line 2; and Copying set message is not relevant to fax jobs so it is not displayed on line 3. The Network/Print Controller is not required for Fax jobs so that information is not displayed in the Fax screen. The Copy/Print Cartridge status is not required for Fax jobs so that information is not displayed in Fax screen.

If the customer then switches to view the Print Queue screen, information required by the customer to complete their Print Queue job is displayed. Document size message is not relevant for Print Queue jobs so it is not displayed on line 2. Copying set message is not relevant for Print Queue jobs so it is not displayed on line 3. The Network/Print Controller is required for Print Queue jobs so that information is displayed. The Copy/Print Cartridge status is required for Print queue jobs so that information is displayed.

EXAMPLE 3

The customer can customize existing messages to make them unique for their machine, location, country, etc.

Figure 13:
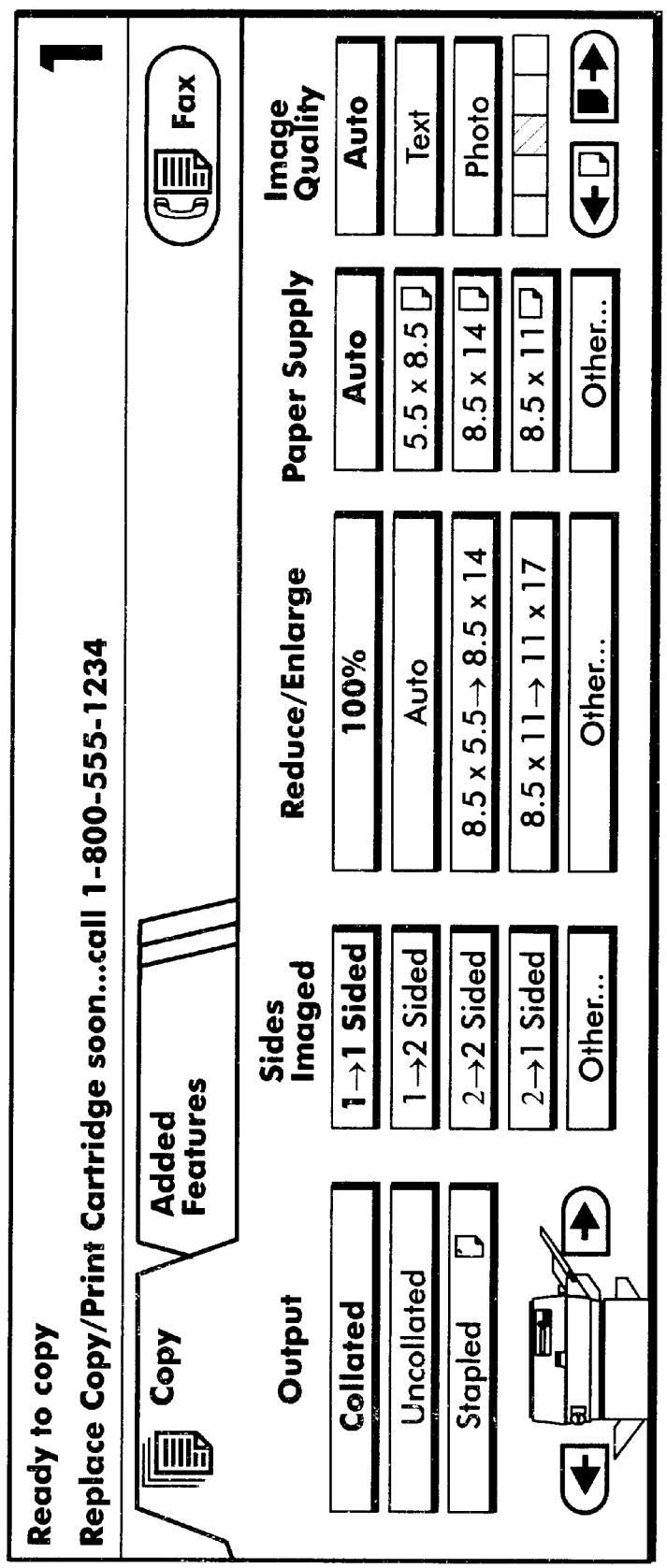
FIG. 13 is an elevational view of a screen including a set of status information and attribute related information corresponding with the Copy service.

Sales, Service, Key operator or customer can provide the database (see Table 1 above) with special information, such as a telephone number usable in ordering supplies. In the illustrated embodiment of FIG. 13, a supply ordering number is attached to the existing message. As contemplated herein, the special information would be supplied through use of another code in the database.

Numerous features of the above-described print media sheet tray control arrangement will be appreciated by those skilled in the art.

In one embodiment, status messages are coupled with services so that selective display of status messages is achieved. This coupling is achieved by linking each status message with a code set. Through suitable configuration of the code sets, displayed status messages have a meaningful relationship to other information with which they are displayed. Moreover, the code sets can be configured to insure that the status messages are properly "weighted". In this way the most important messages can be displayed prior to displaying messages of lesser importance.

In another embodiment, a message storage system with a configurable database is provided. Each of the messages in the database are corresponded with a code set, the code set controlling a manner in which the message corresponding therewith is displayed. In response to user input, a given code set can be changed or a new set added. This ability to change a code set or add a new code set provides the UI with a high degree of flexibility and permits a machine owner to accommodate for changes in system demand. Moreover, through use of a configurable database, the text portions of messages can be altered customize messages for the particular needs of a user. Finally, the design of the code sets themselves greatly facilitate operation of any printing machine with which it is associated. The code sets can be used to promptly resolve display conflicts and to associate particular messages with the services to which they logically belong. The code sets can also be used to control placement of corresponding messages on a display screen and to link messages together. By linking messages together it is easy to control the transfer of related messages to and from the display screen.

What is claimed is:

1. In a multifunctional printing system including a printing machine for producing prints from an electronic document stored therewith, the printing machine including a user interface with a display screen upon which one or more of a plurality of messages can be displayed for providing a user, at a customer use site, with status information about the printing system, a programmable message storage system for storing the plurality of messages, comprising:

a configurable database for listing a plurality of message identifiers, the plurality of message identifiers corresponding respectively with the plurality of messages;

a plurality of code sets corresponding respectively with the plurality of message identifiers, each code set controlling a manner in which a corresponding message is displayed on the display screen; and at least one of the plurality of code sets being user programmable so that, in response to user input, the at least one of the plurality of code sets is reconfigured in the database for changing the manner in which the message corresponding with the at least one of the plurality of codes sets is displayed as a function of said reconfiguring.

2. The programmable message storage system of claim 1, in which each code set includes a control indicator and a display conflict arises between two of the plurality of messages, wherein the conflict is resolved by reference to the control indicators of the two of the plurality of messages.

3. The programmable message storage system of claim 2, wherein in the control indicator varies as a function of message priority.

4. The programmable message storage system of claim 1, in which a first service type screen is displayed on the display screen at a first time and a second service type display screen is displayed on the display screen at a second time, wherein one of the plurality of code sets includes an indicator linking the message corresponding with the one of the plurality of code sets to the first service type screen and another one of the plurality of code sets includes an indicator linking the message corresponding with the other one of the plurality of code sets to the second service type screen.

5. The multifunctional printing system of claim 1, in which the display screen is partitioned multiple sections with one of the sections including two or more lines, wherein at least one of the plurality of code sets includes a line designator for designating on which one of the multiple lines the message corresponding with the at least one of the plurality of code sets is to be displayed.

6. The programmable message storage system of claim 1, in which each of the plurality of code sets is corresponded respectively with message text, wherein the message text is changeable in response to user input.

7. In a multifunctional printing system including a printing machine for producing prints from an electronic document stored therewith, the printing machine including a user interface with a display screen upon which one of a plurality of messages can be displayed for providing a user, at a customer use site, with status information about the printing system, a programmable message storage system for storing the one or more of the plurality of messages, comprising:

a configurable database for listing a plurality of message identifiers, the plurality of message identifiers corresponding respectively with the plurality of messages;

a plurality of code sets corresponding respectively with the plurality of message identifiers, each code set controlling a manner in which a corresponding message is displayed do the display screen; and wherein at least one of the plurality of code sets is removable from the database, in response to user input, so that upon removal of the at least one of the plurality of code sets from the database the message corresponding with the at least one of the plurality of code sets is no longer displayable with the user interface.

8. In a multifunctional printing system including a printing machine for producing prints from an electronic document stored therewith, the printing machine including a user interface with a display screen upon which one of a plurality of messages can be displayed for providing a user, at a customer use site, with status information about the printing system, a programmable message storage system for storing the one or more messages, comprising:

a configurable database for listing a plurality of message identifiers, the plurality of message identifiers corresponding respectively with the plurality of messages;

a plurality of code sets corresponding respectively with the plurality of message identifiers, each code set controlling a manner in which a corresponding message is displayed on the display screen; and wherein a new code set is addable to said database, in response to user input, so that a message corresponding with the new code set is displayable with the user interface when the new code set is added to the database.

9. In a multifunctional printing system including a printing machine for producing prints from an electronic document stored therewith, the printing machine including a user interface with a display screen upon which one or more of a plurality of messages can be displayed for providing a user with status information about the printing system, a programmable message storage system for storing the plurality of messages, comprising:

a configurable database for listing a plurality of message identifiers, the plurality of message identifiers corresponding respectively with the plurality of messages;

a plurality of code sets corresponding respectively with the plurality of message identifiers, each code set controlling a manner in which a corresponding message is displayed on the display screen, said plurality of code sets including a first code set and a second code set, wherein each of the first and second code sets includes a linking designator so that when the message corresponding with the first code set is displayed the message corresponding with the second code set is automatically displayed therewith; and at least one of the plurality of code sets being user programmable so that, in response to user input, the at least one of the plurality of code sets is reconfigured in the database for changing the manner in which the message corresponding with the at least one of the plurality of codes sets is displayed as a function of said reconfiguring.

* * * * *